No. 728,515. PATENTED MAY 19, 1903.
P. & L. TRABUE.
INDICATOR FOR BALING PRESSES.
APPLICATION FILED FEB. 27, 1903.
NO MODEL.
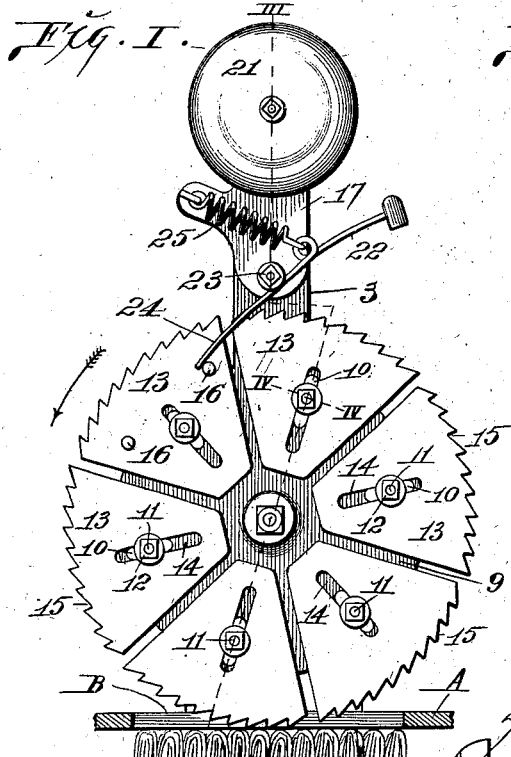
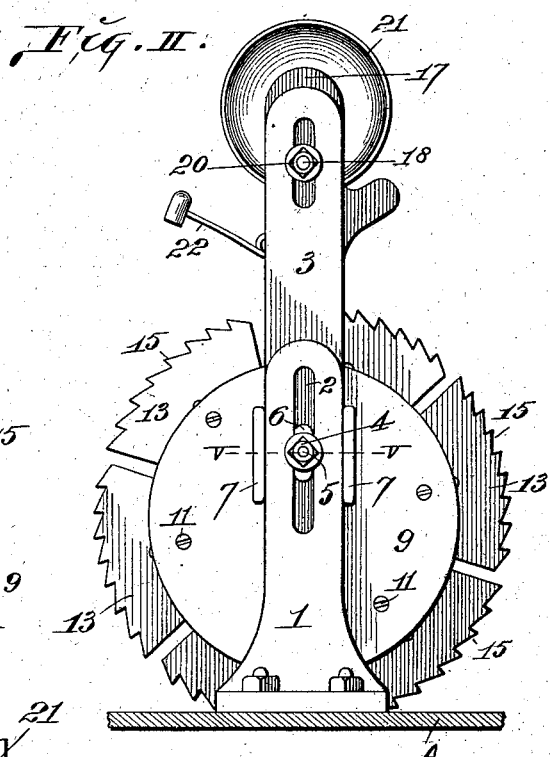
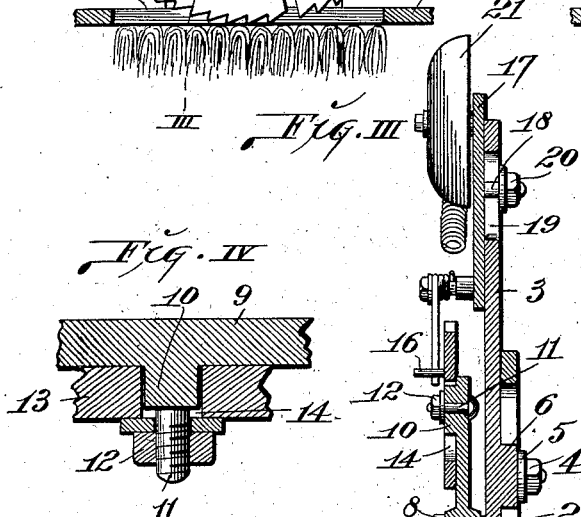
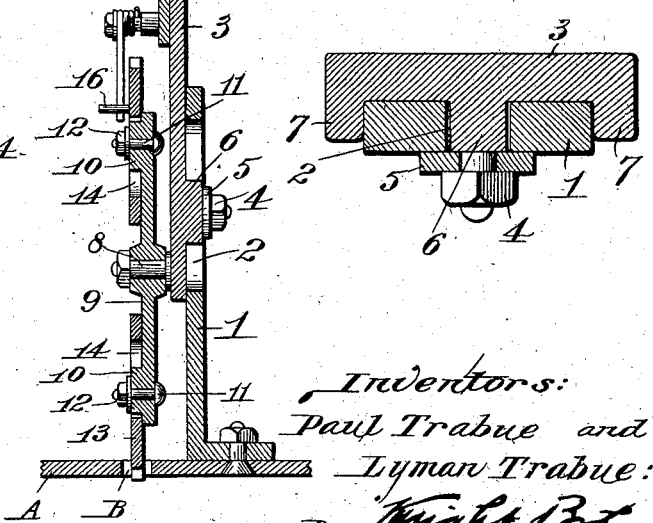
Inventors:
Paul Trabue and
Lyman Trabue:—
By Knight Bro.
atty's
Attest:—
M. P. Smith
E. S. Knight No. 728,515. Patented May 19, 1903.

UNITED STATES PATENT OFFICE.

PAUL TRABUE AND LYMAN TRABUE, OF GIRARD, ILLINOIS.

INDICATOR FOR BALING-PRESSES.

SPECIFICATION forming part of Letters Patent No. 728,515, dated May 19, 1903.

Application filed February 27, 1903. Serial No. 145,362. (No model.)

*To all whom it may concern:*

Be it known that we, PAUL TRABUE and LYMAN TRABUE, citizens of the United States, residing in Girard, in the county of Macoupin and State of Illinois, have invented certain new and useful Improvements in Indicators for Baling-Presses, of which the following is a full, clear, and exact description, reference being had to the accompanying drawings, forming part of this specification.

Our invention relates to an indicator for service in affording signals upon the completion of bales formed in baling-presses, whereby the operator is notified that sufficient material has been fed into the press to constitute the bale of a size desired.

The invention consists in features of novelty hereinafter fully described, and pointed out in the claims.

Figure I is a front elevation of our indicator. Fig. II is a rear elevation. Fig. III is a vertical section taken on line III III, Fig. I. Fig. IV is a cross-section taken on line IV IV, Fig. I. Fig. V is a cross-section taken on line V V, Fig. II.

A designates the top wall of a baling-press box containing a longitudinal slot B, located in the path of travel of the material formed into a bale in said box.

1 designates a standard mounted on the wall A adjacent to the slot B. This standard is provided with an elongated aperture 2. (See Figs. II and III.) 3 is an upright slidably held to the standard 1 by a nut 4 and washer 5, applied to an elongated boss 6, that fits within the elongated aperture 2 in said standard. The upright is also held to the standard by flanges 7, projecting from its edges at the lower end and embracing the standard.

8 is a stub-shaft carried by the upright 3 at its forward side.

9 designates a disk journaled on the stub-shaft 8 and provided at its forward side with a series of elongated lugs 10.

11 designates bolts inserted through the disk 9 and lugs 10 and bearing nuts 12.

13 designates adjustable plates provided with slots 14, which receive the lugs 10. These plates 13 are preferably of segmental shape, and they are held to the disk 9 by the bolts 11, which pass therethrough to secure them in radially-arranged positions. Each plate 13 is provided at its outer edge with series of serrations 15, and one of the plates has projecting therefrom pins 16, preferably two in number, as seen in Fig. I.

17 designates a plate secured to the upright 3 by a bolt 18, that passes through an aperture 19 in said upright and bears a nut 20, by which the bolt is held in a fixed position in said slot at any desired elevation to support the plate 17.

21 is a gong supported by the plate 17.

22 is a trip-hammer pivoted at 23 to the plate 17 and having an arm 24, that projects from its pivotal point into the path of travel of the pins 16 on the plate 13, that carries them.

25 is a retractile spring having one end connected to the plate 17 and the opposite end connected to the trip-hammer 22.

In the practical use of our indicator the adjustable serrated plates 13 are adjusted inwardly or outwardly to diminish or increase the circumference of the series of plates in wheel form, so that such circumference will correspond to the length of the bale which it is desired to form in the baling-press box. It will be seen that in this connection a very considerable circumferential range is provided for, inasmuch as the plates may be assembled in compact condition, so that their edges will rest against each other at the side of the disk 9, by which they are carried, thereby furnishing a reduced circumference, or the plates may be moved outwardly to any desired extent to increase the circumference of the wheel which they form. In the readjustment of the plates 13 it is necessary to readjust the trip-hammer 22, so that its arm will project properly into the path of travel of the pins 16, to be struck thereby and cause the trip-hammer to be moved and rebound to ring the gong 21. In the act of baling the material in the baling-press box the material engages the serrations 15 of the plates 13 as it passes beneath them, thereby causing the plates to travel in a circular path. When the disk 9 has been carried near a complete revolution in the movement of the plates 13, the pin 16 that first encounters the trip-hammer arm 24 trips said hammer and causes an alarm to be sounded to indicate that the bale is almost completed. When the next pin 16 strikes said arm, an alarm is sounded to indicate that the bale is complete. As the bale of material is formed in the press-box of the baling-press to which our indicator is applied the wheel of the indicator, composed of the disk 9 and the plates 13, gravitates in the slot B of the press-box, resting constantly on the bale, and is rotated by the material of the bale as the forming of such bale progresses. This gravitation of the indicator-wheel is permitted by the slidable connection between the upright 3 and the standard 4 of the indicator, the boss 6 moving freely downwardly in the slot of said standard and being retained in the slot 2 of the standard during such movement by the nut 4, which is preferably backed by the washer 5. The advantage of this arrangement is that the material of the bale being produced provides an actuator for the indicator-wheel, and said wheel readily and continually adapts itself to the surface of such material whether even or uneven. In the event of unevenness of the bale material at the top side, where it contacts with the indicator-wheel, the wheel accommodates itself to such unevenness, and no rotation thereof is lost, the wheel gravitating and turning as freely on an uneven surface as upon an even surface. It will also be seen that the wheel will accommodate itself to the offsets between the bales produced by the division-blocks located between them, which are lower than the bales, and will therefore be constantly in the proper position to be engaged by the next succeeding bale.

We claim as our invention—

In an indicator for baling-presses, the combination of a slotted standard, an upright movably secured to said standard, a disk rotatably supported by said upright, a series of sections extensibly carried by said disk, a plate adjustably secured to said upright, a gong mounted on said plate, and means for sounding said gong on the rotation of said disk, substantially as set forth.

PAUL TRABUE.
LYMAN TRABUE.

In presence of—
LUTHER TRABUE,
J. H. TIETSORT.